United States Patent [19]
Zelli

[11] 4,398,469
[45] Aug. 16, 1983

[54] LATERALLY COMPENSATING RADIAL TROLLEYS

[76] Inventor: Sante Zelli, 24, Via della Pace, Rome, Italy

[21] Appl. No.: 199,473

[22] Filed: Oct. 22, 1980

[30] Foreign Application Priority Data

Oct. 22, 1979 [IT] Italy ............................... 50638 A/80

[51] Int. Cl.³ ..................... B61D 15/00; F16M 11/00; G03B 17/12; G03B 21/14
[52] U.S. Cl. ........................................ 105/170; 74/98; 105/169; 212/205; 248/647; 352/243; 354/293; 358/229
[58] Field of Search .................... 74/98; 105/150, 153, 105/156, 163, 169, 179, 180, 170; 212/205, 218, 219; 238/134, 135, 231, 232; 248/188.6, 188.7, 647; 254/8; 280/47.11, 81 A; 352/89, 140, 243; 354/81, 293, 294; 358/108, 229

[56] References Cited

U.S. PATENT DOCUMENTS

| | | | |
|---|---|---|---|
| 61,579 | 1/1867 | Tarr ..................................... | 238/231 |
| 2,052,865 | 9/1936 | Burnett ................................. | 238/135 |
| 2,458,445 | 1/1949 | Stoddard ........................ | 105/179 X |
| 2,725,783 | 12/1955 | Jackson ............................... | 352/243 |
| 2,855,155 | 10/1958 | Andrianne .......................... | 238/135 |
| 2,955,546 | 10/1960 | Liebherr et al. ............. | 105/163 R X |
| 3,829,175 | 8/1974 | Vogeli ............................. | 105/156 X |
| 3,839,968 | 10/1974 | Kolk et al. ...................... | 105/156 X |
| 3,915,429 | 10/1975 | Zelli ................................... | 254/8 R |

FOREIGN PATENT DOCUMENTS

| | | | |
|---|---|---|---|
| 358029 | 9/1922 | Fed. Rep. of Germany ..... | 295/9 R |
| 29526 | 7/1964 | German Democratic Rep. ................................... | 105/179 |
| 208340 | 10/1923 | United Kingdom ............... | 295/9 R |

Primary Examiner—Bruce H. Stoner, Jr.
Assistant Examiner—Howard Beltran
Attorney, Agent, or Firm—Ernest F. Marmorek

[57] ABSTRACT

A rail-supported carriage, adapted to be moved along a pair of rails spaced from one another at a predetermined distance includes at least three wheel assemblies, each including a frame; at least one wheel assembly is adapted to travel on one rail, and the remaining wheel assemblies are adapted to travel on the oppositely disposed rail. A connecting mechanism connects oppositely disposed wheel assemblies, and includes a compensating arrangement mounted on each wheel assembly for compensating any variation of distance between oppositely disposed wheel assemblies due to any curvature in the rails, each compensating arrangement includes a platform and a pin passing through the platform, and wherein the platform is movable with respect to the frame.

11 Claims, 7 Drawing Figures

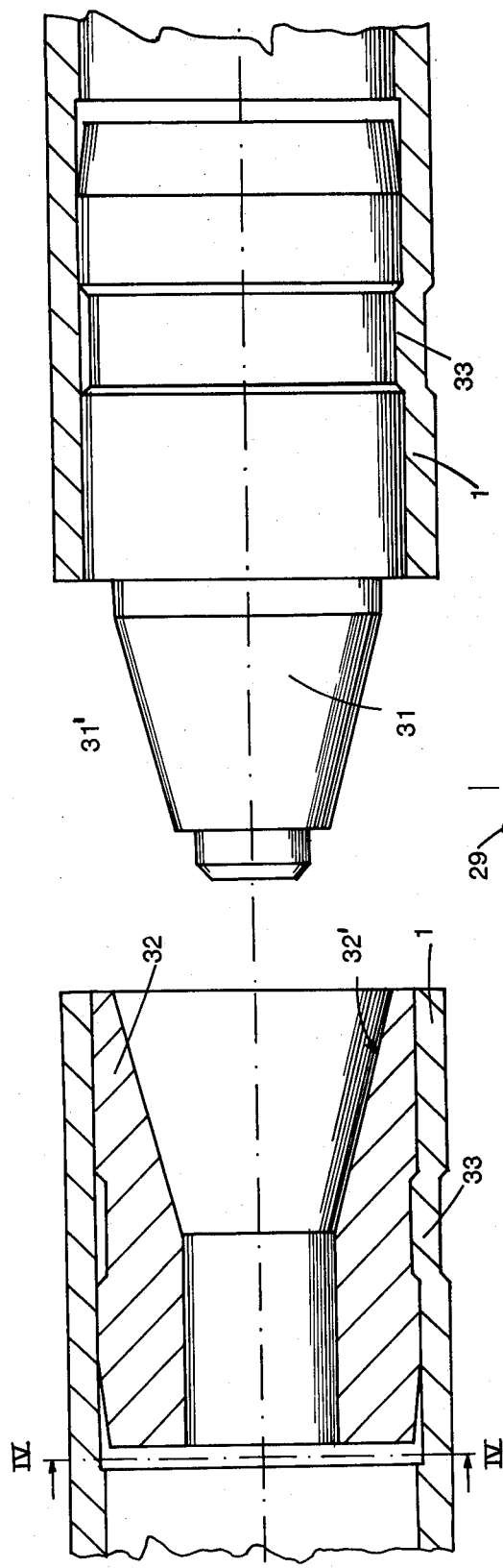

LATERALLY COMPENSATING RADIAL TROLLEYS

FIELD OF THE INVENTION

The invention relates to rolling devices for vehicle tracks, particularly for trolleys manually moved along straight or curved rails, which support motion picture cameras or video cameras.

BACKGROUND OF THE INVENTION

One of the principal problems encountered in obtaining good motion pictures or television pictures, is to eliminate any kind of noise or vibration during movement of a trolley, which supports the video camera. In the case of outdoor scenes, these trolleys are arranged to move on special tracks formed by rails, on which the wheels of the trolley travel. Even any minimal vibration or noise caused by the movement of the wheels on the rails is transmitted in an amplified manner to the video camera, with a consequent deterioration of the motion or television pictures. Reference should be had to U.S. Pat. No. 3,915,429, issued to the applicant of the present invention, for additional background information.

SUMMARY OF THE INVENTION

It is an object of the present invention to eliminate these problems by means of a novel combination of a new design of the rails and the wheels of the trolley. The wheels of the trolley are substantially constituted by wheel assemblies, on which are mounted a pair of wheels, articulated and coupled to each other by transmission means, such as gears; an idler wheel of a diameter larger than that of the corresponding wheel is mounted on each side thereof coaxially with the shaft of the wheel.

By means of this configuration, the source of the vibrations and noise can be eliminated, which source is constituted by the fact, that when a trolley enters a curve, the wheels which support it, and particularly idler wheels, on each side of a rail-contacting wheel, which ensure that the wheels are centered with respect to the rails, give rise to an increase in friction, because of the curvature of the rails causing in this manner vibrations and noise.

The tracks on which the wheel assemblies move is constituted by a pair of rails, each having a cross-section particularly shaped, so as to have a plane surface on which the wheels of the wheel assembly are arranged to travel.

BRIEF DESCRIPTION OF THE DRAWING

Other advantages and characteristics of the invention will be evident from the following description, made with reference to the enclosed drawings in which:

FIG. 4 is a cross-section of the rail along the line IV—IV of FIG. 5a;

FIG. 5a is a longitudinal section of a female-type coupling element along its center, and FIG. 5b is a longitudinal section of a male-type coupling element along its center, the coupling elements acting as spacers between the rails.

DESCRIPTION OF THE PREFERRED EMBODIMENTS

Figure 1:
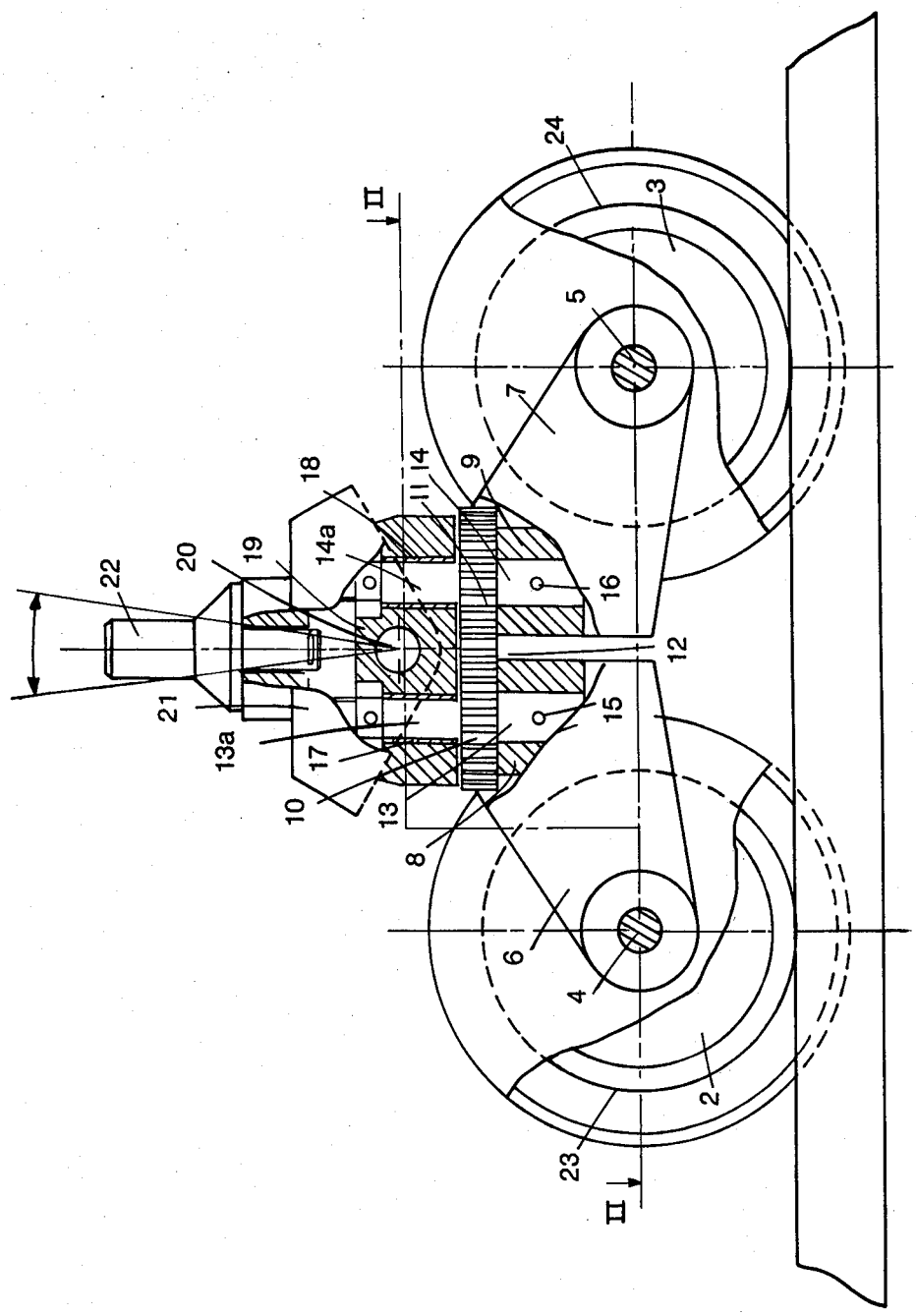
FIG. 1 is a partial longitudinal section of the wheel assembly of the present invention along line I—I of FIG. 2.

FIG. 1 shows a longitudinal section of a wheel assembly or shoe 40, which moves on rails 1 by means of two wheels 2 and 3, rotatable respectively about axles 4 and 5; the axles 4 and 5 are in turn supported by two wheel guides or supporting members, such as forks 6 and 7, which are respectively secured to two supporting blocks 8 and 9, on which are rigidly fastened two transmission means, such as gears 10 and 11, which engage each other at the contact area 12.

Shafts 13 and 14 pass through the support blocks 8 and 9, respectively, and the gears 10 and 11 are rigid with the shafts 13 and 14, respectively. The shafts 13 and 14 are also secured to the support blocks 8 and 9 by means of pins 15 and 16, respectively.

Extensions 13a and 14b of the shafts 13 and 14, are inserted respectively into two bushings 17 and 18, in which the shafts 13 and 14 are free to rotate, the bushings being fixed to a support element 19. A pin 20 passes through the support element 19 at right angles to the plane of FIG. 1. A platform 21 is arranged to be pivotably mounted on the pin 20; to the upper part of the platform 21 there is fastened a threaded rod 22, which acts as a support for a trolley 43 shown in FIG. 3a and 3b.

Figure 2:
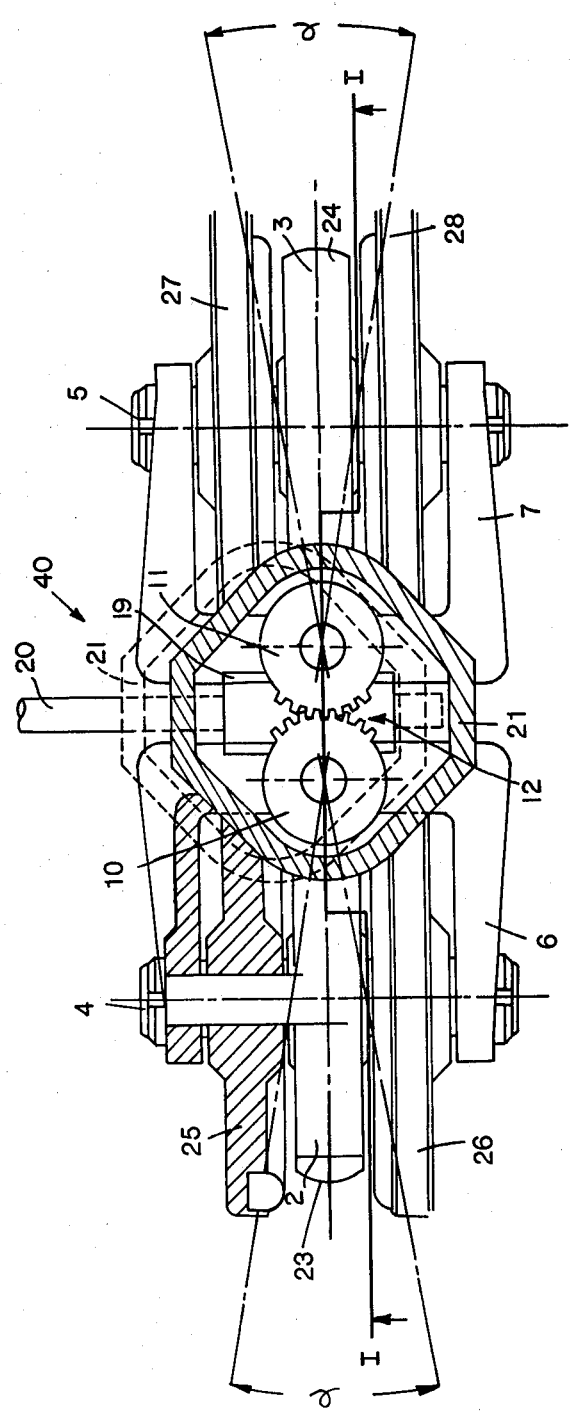
FIG. 2 is a top plan view of the wheel assembly in section along line II—II of FIG. 1.

FIG. 2 shows a top view in section of the wheel assembly 40; some elements have been omitted in FIG. 2 for the sake of clarity.

In FIG. 2, the gears 10 and 11 can be seen engaged with each other at the contact area 12 in such a way as to permit the the two forks 6 and 7 to pivot about a certain angle α; wheels 2 and 3 are journaled in the forks 6 and 7 respectively.

The wheels 2 and 3 are provided with respective treads 23 and 24. The wheels 2 and 3, which are coupled to one another, remain on the rails 1 due to idler wheels of a larger diameter 25 and 26 being disposed on respective opposite sides of wheel 2, and idler wheels 27 and 28 being disposed on respective opposite sides of the wheel 3. The wheels 25 and 26, on one hand, and 27 and 28 on the other hand are mounted on the axles 4 and 5, respectively, so as to serve as the idler wheels. Connecting arms 45 connect wheel assemblies 40 disposed on respective opposite rails, as can best be seen in FIGS. 3a and 3b.

Another problem area encountered is the variation of the diagonal spacing between wheel assemblies 40, when the trolley or rail-suspended carriage 43 enters or leaves a curve. This problem is resolved, according to the invention, by means of the pin 20 (FIG. 1) being slidably disposed within the support element 19. The platform 21 is secured to the pin 20, and the pin 20 is allowed to axially slide within the support element 19. Of course, it is alternately possible for the pin 20 to be fixed to the support element 19, and for the platform 21 to axially slide along the pin 20. Obviously not all of the wheel assemblies 40 of a trolley need to be designed to permit the support element 19 to be movable relative to the pin 20, but it is sufficient to provide, for instance, two of the wheel assemblies 40 with this capability on the rail 1, while the other two wheel assemblies need not have this sliding capability. However, the solution of the problem of compensating for the variations of the diagonal support of a trolley on curved rails can also be different from the particular construction set forth above, without affecting the scope of the present invention.

Figures 3A, 3B:
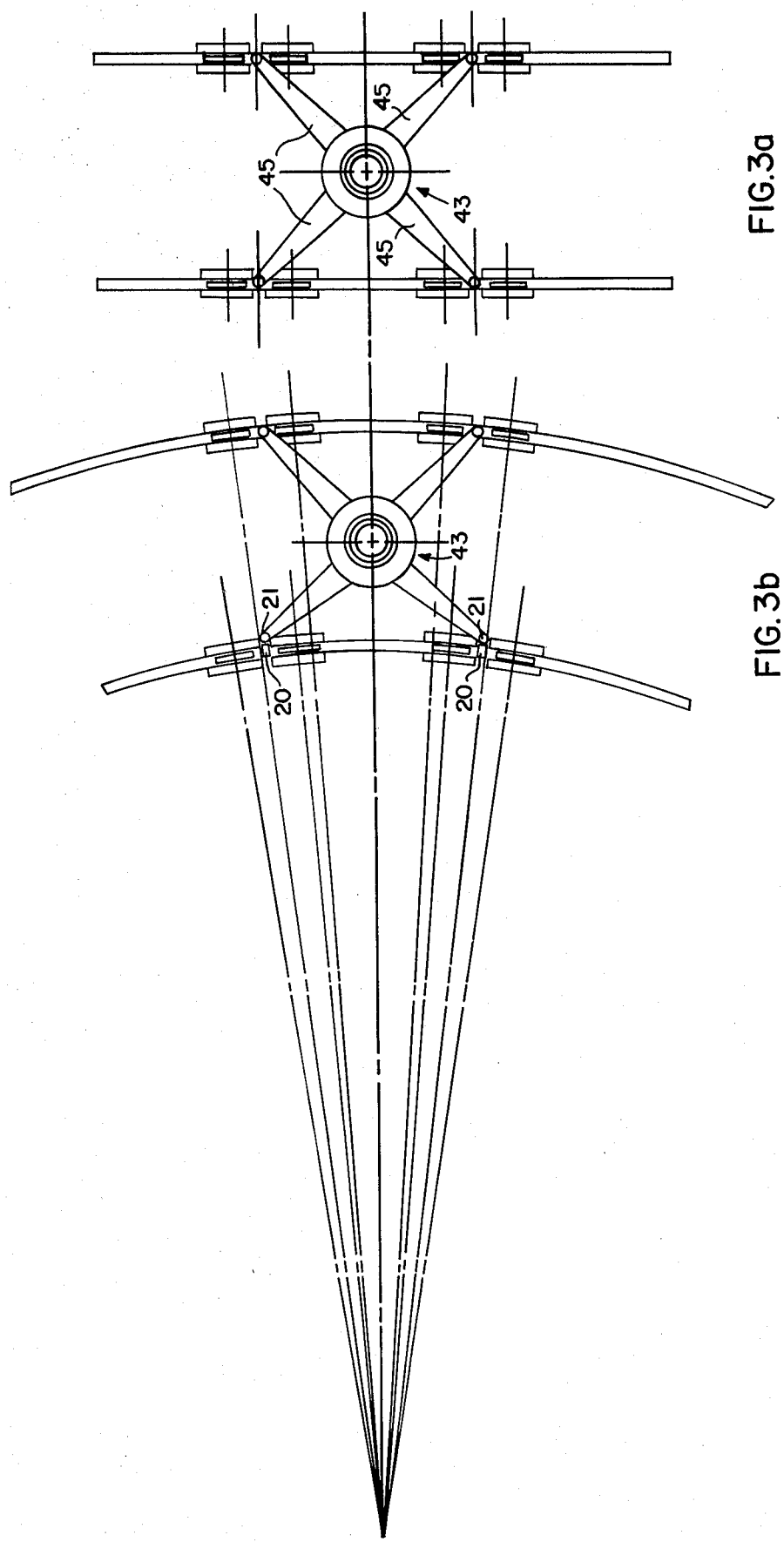
FIG. 3a is a schematic view showing the operation of the trolley on a straight track.
FIG. 3b is a schematic view showing the operation of the trolley on a curved track.

FIGS. 3a and 3b show schematically the operation of the present invention; in FIG. 3a it can be seen that when the trolley 43 travels along a straight line, the axes of the wheels of the wheel assemblies 40 are all at right angles to the axis of the rails, but when it enters a curve, the axles take up different angles with respect to each other, but the axes or axles 4 and 5 of all wheels 2 and 3 of the trolley 43 converge to the center of curvature of the rails 1.

This spontaneous variation of the angles the wheel assemblies 40 take up with respect to one another is especially important when the trolley 43 enters or leaves a curved track, or even more important, when the trolley 43 travels along a curve; because it becomes possible by means of a system of articulated wheels to diminish friction by about 50% with respect to trolleys which have wheel assemblies with fixed wheels, with a consequent remarkable reduction of manual effort necessary for pushing the trolley along the rails.

FIG. 4 shows the rail 1, according to the invention, which has a partly circular cross-section for about half of its lower periphery, while its upper part, which is arranged to make contact with the wheels 2 and 3 of the trolley, has a plane surface 29 which is joined to the lower part-circular surface by means of two lateral straight-lined portions 30 and 30'.

The wheels 2 and 3 of the trolley therefore make contact with the plane surface 29, while the two lateral idler wheel pairs 25 and 26, on one hand, and 27 and 28, on the other hand, make only light contact on the straight-lined tracks 30 and 30', thus producing a soft and silent sliding of the trolley 43 also on curved portions of the rails 1.

The coupling of the rail tracks shown in FIGS. 5a and 5b used for maintaining the rails 1 properly spaced from one another is essentially constituted by a male element 31 and a female element 32, which female element 32 has a truncated cone cavity 32', corresponding to the profile 31' of the male element arranged to be inserted into the cavity 32'; the fastening of the two elements 32 and 33 to the respective ends of the rails 1 is effected by insertion of the elements 31 and 32 into respective grooves 33 of the rails 1. Maintaining the two rail ends at a fixed spacing can be obtained by any suitable method. This type of insertion of the ends of two rail tracks, as illustrated, as has already been stated, is not a limiting example, but the insertion of these two elements can also be effected by means of different arrangements than those described and shown above.

Naturally the range of this invention is not limited to the example shown and described above, but comprises also all possible variations known in the art in this field; the present invention, applied in this case to trolleys for motion and television pictures, can obviously also be applied to any industrial vehicles, where the problem of friction and lateral stability exists, as for instance, to industrial vehicles.

A particular application can be envisaged in the field of railways, where the problem of lateral stability is resolved by means of a central pivot, so that every car has its fulcrum only at this point; by means of the present invention, however, each car can rest on eight lateral points, thus resolving what is one of the major problems of stability relating to trains at high speed. Besides the remarkable decrease of friction results also in a decrease of energy consumption, in turn permitting a decrease in the radius of curvature of the rails; the foregoing does not diminish the scope of protection of the invention, as outlined in the appended claims.

I claim:

1. A rail-supported carriage, adapted to be moved along a pair of rails spaced from one another at a predetermined distance,
comprising in combination:
at least three wheel assemblies, each assembly including an articulated frame, at least one wheel assembly being adapted to travel on one rail, the remaining wheel assemblies being adapted to travel on the oppositely disposed rail, and
connecting arms interconnecting oppositely disposed wheel assemblies, and compensating means mounted between the frame of each wheel assembly and at least some of said connecting arms, establishing a sliding relation therebetween for regulating any variation of lateral distance between oppositely disposed wheel assemblies due to any curvature in said rails.

2. A carriage, as claimed in claim 2, further comprising
each wheel assembly including two horizontal axles, and two wheels rotatably mounted on said axles, respectively,
the wheels of each wheel assembly being movable with respect to each other around a respective vertical axle between a first limit position wherein the planes of the wheels are coplanary, and respectively, a second position wherein the two planes form a certain angle, the wheels being capable of assuming continuously any intermediate position,
each wheel assembly including the supporting members each mounted on a vertical axle, and
transmission means rigidly mounted on each supporting member, the transmission means of each wheel assembly engaging each other and being movable within a predetermined angle relative to one another to establish the maximum angle which said planes can form between each other.

3. The carriage as claimed in claim 1, wherein each wheel assembly includes
two wheel guides mounted on said frame so as to be pivotable thereon in a generally horizontal plane, each wheel guide including an axle rotatably mounted on said wheel guide, and a wheel rotatably mounted on each axle, and
a transmission rigidly mounted on each wheel guide, the transmissions of each wheel assembly engaging each other, and being movable with a predetermined angle relative to one another, the wheels of each wheel assembly thereby being movable with respect to one another in their respective planes.

4. The carriage as claimed in claim 3, wherein each wheel assembly includes two pairs of idler wheels rotatably mounted on said axles, respectively, on each side of a corresponding wheel, each idler wheel having a diameter exceeding that of the wheel coaxially mounted therewith, whereby each wheel assembly may be substantially centered with respect to the corresponding rail.

5. The carriage as claimed in claim 4, wherein each pair of idler wheels defines a maximum outer distance, and wherein each wheel guide includes a fork having arms pivotably arranged on a corresponding axle, the inner spacing between said arms exceeding the outer spacing of a corresponding pair of idler wheels.

6. The combination of a rail-supported carriage and a pair of rails spaced from one another at a predetermined distance, said rail-supported carriage comprising at least three wheel assemblies, each assembly including an articulated frame, at least one wheel assembly being adapted to travel on one rail, the remaining wheel assemblies being adapted to travel on the oppositely disposed rail, and connecting arms interconnecting oppositely disposed wheel assemblies, and compensating means mounted between the frame of each wheel assembly and at least some of said connecting arms, establishing a sliding relation therebetween for regulating any variation of lateral distance between oppositely disposed wheel assemblies due to any curvature in said rails.

7. The combination as claimed in claim 6, wherein each wheel assembly includes two wheel guides mounted on said frame so as to be pivotable thereon in a generally horizontal plane, each wheel guide including an axle rotatably mounted on said wheel guide, and a wheel rotatably mounted on each axle, a transmission rigidly mounted on each wheel guide, the transmissions of each wheel assembly engaging each other, and being movable with a predetermined angle relative to one another, the wheels of each wheel assembly thereby being movable with respect to one another in their respective planes, and two pairs of idler wheels rotatably mounted on said axles, respectively, on each side of a corresponding wheel coaxially mounted therewith, whereby each wheel assembly may be substantially centered with respect to a corresponding rail.

8. The combination as claimed in claim 7, wherein each rail has a lower portion, a substantially straight upper portion and substantially straight side portions joining said upper portion to said lower portion, each pair of idler wheels having inner sides operatively abutting said side portions, respectively.

9. The combination as claimed in claim 8, wherein said lower portion is part-cylindrical.

10. The combination as claimed in claim 6, further comprising spacing means for maintaining said rails at said predetermined radial distance, at least at opposite ends thereof, including a female element having a recess and a male element provided with a projection mating with said recess, said male and female elements being securable to said rails, respectively.

11. The combination as claimed in claim 10, wherein each of said male and female elements has a groove mating with a corresponding of said rails when said spacing means maintains said rails at said predetermined distance.

* * * * *